United States Patent
Song et al.

(10) Patent No.: US 8,659,999 B2
(45) Date of Patent: Feb. 25, 2014

(54) METHOD AND SYSTEM FOR RESOURCE AND ADMISSION CONTROL IN AN NGN HOME NETWORK

(75) Inventors: Jun Song, Shenzhen (CN); Jianjie You, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 105 days.

(21) Appl. No.: 12/992,222

(22) PCT Filed: Jul. 17, 2009

(86) PCT No.: PCT/CN2009/072815
§ 371 (c)(1),
(2), (4) Date: Nov. 11, 2010

(87) PCT Pub. No.: WO2010/081314
PCT Pub. Date: Jul. 22, 2010

(65) Prior Publication Data
US 2011/0261690 A1    Oct. 27, 2011

(30) Foreign Application Priority Data
Jan. 14, 2009 (CN) .......................... 2009 1 0076375

(51) Int. Cl.
*H04L 12/24* (2006.01)
(52) U.S. Cl.
USPC ............ 370/230; 370/228; 370/229; 370/231
(58) Field of Classification Search
USPC ................................... 370/228–231
See application file for complete search history.

(56) References Cited

FOREIGN PATENT DOCUMENTS

| CN | 100538746 | 1/2008 |
|----|-----------|--------|
| CN | 101207632 | 6/2008 |
| CN | 101222453 | 7/2008 |
| CN | 101262415 | 9/2008 |
| CN | 101296172 | 10/2008 |
| EP | 2254292 A1 | 11/2010 |

OTHER PUBLICATIONS

Resource and admission control functions in next generation networks Y.2111, Nov. 13, 2008 pp. 1-176.*
International Search Report for International Application No. PCT/CN2009/072815 mailed Oct. 1, 2009.
Resource and admission control functions in next generation networks Nov. 13, 2008.
Proposed to add the wholesale scenario in Y.PACF; C 154 Jan. 7, 2009.
Proposed to add the CPN control for the wholesale scenario in Y.PACF; C 152 Jan. 7, 2009.

(Continued)

*Primary Examiner* — Andrew Chriss
*Assistant Examiner* — Romani Ohri
(74) *Attorney, Agent, or Firm* — Oppedahl Patent Law Firm LLC

(57) ABSTRACT

The present disclosure discloses a method and system for resource and admission control in an NGN home network. Through setting up an Rh interface between the Policy Decision Function Entity of the NGN service provider and the Home Gateway Enforcement Function Entity in the customer premise network, the Policy Decision Function Entity of the service provider makes the resource and admission control policy for the customer premises network and sends down the policy rules to the customer premises network through the interface. Thus the quality of service of the network that the users use could be ensured well.

11 Claims, 5 Drawing Sheets

(56) References Cited

OTHER PUBLICATIONS

Supplementary European Search Report in European application No. 09838101.5, mailed on May 31, 2012.

English Translation of the Written Opinion of the International Search Authority in international application No. PCT/CN2009/072815, mailed on Oct. 1, 2009.

ITU-T Y.2011, Resource and admission control functions in next generation networks, Nov. 13, 2008.

* cited by examiner

METHOD AND SYSTEM FOR RESOURCE AND ADMISSION CONTROL IN AN NGN HOME NETWORK

CROSS-REFERENCE TO RELATED APPLICATIONS

This patent application is a U.S. national phase application of International Patent Application No. PCT/CN2009/072815, filed Jul. 17, 2009, which claims priority to China Patent Application No. 200910076375.5, filed Jan. 14, 2009, each of which is hereby incorporated by reference herein in its entirety.

TECHNICAL FIELD

The present disclosure relates to the field of Next Generation Networks (NGN), and more specifically to a method and system for resource and admission control in an NGN home network.

BACKGROUND

As a hot-spot research subject in today's communication standardization field, NGN adopts packet technologies as the carrier network technology to converge fixed communication technology and mobile communication technology. NGN can provide more abundant multimedia services, such as emerging services with real-time requirement (e.g. VoIP, video conferencing, multimedia remote teaching and video-on-demand), these services require the communication network to provide highly efficient end-to-end Quality of Service (QoS) support, and meanwhile the customer has increasingly higher requirements on network service quality. Therefore, how to provide end-to-end QoS support may be one of the core issues of NGN.

As the telecommunication standardization sector of International Telecommunication Union (ITU), ITU-T has made the standards on resource and admission control. The latest draft of Resource and Admission Control Functions (RACF) issued by ITU-T in September 2008 provides the function framework of RACF, as shown in FIG. 1. The RACF consists of two parts which are Policy Decision Functional Entity (PD-FE) and Transport Resource Control Functional Entity (TRC-FE).

The PD-FE is independent of the transport technology and Service Control Functions (SCF). The PD-FE makes a final decision for resource and admission control based on network policy rules, service information provided by the SCF, transport layer subscription information provided by Network Attachment Control Functions (NACF) as well as resource availability policy result information provided by the TRC-FE.

The TRC-FE is independent of service, but is dependent on transport technology. The TRC-FE is responsible for collecting and maintaining the transport network information and resource status information. After receiving resource request from the PD-FE, the TRC-FE enforces resource-based admission control based on QoS, priority demand, resource availability information and transport-related policy rule information.

The transport function consists of Policy Enforcement Functional Entity (PE-FE) and Transport Resource Enforcement Functional Entity (TRE-FE). The PE-FE is a packet-to-packet gateway which may be located between a Customer Premises Network (CPN) and the access network, between the access network and the core network or between different operator networks, and is the key node supporting dynamic QoS control, port address translation control and Network Address Translator (NAT). The TRE-FE enforces the transport resource policy rules sent down by the TRC-FE. The scope, function and Rn interface of the TRE-FE, which need further research, are not the research object of R2 stage.

Functions of each entity in RACF and transport function as well as collaboration relationship between those entities are described in conjunction with FIG. 1.

PD-FE is a policy decision functional entity, which makes preliminary QoS resource decisions based on media flow session information (obtained from SCF via Rs interface), customer transport resource subscription information (obtained from NACF via Ru interface), and then interacts with TRC-FE to confirm whether there are sufficient QoS resource, and finally makes a final admission decision and sends down the decision to PE-FE for enforcement.

The TRC-FE is mainly used for resource control, which monitors resources in network and collects relevant information, and responds as per specific resource conditions when the PD-FE requests resources.

The PE-FE performs policy control (gating, bandwidth, traffic classification and tagging, traffic shaping, QoS mapping of Layer 2 and Layer 3, and collecting and reporting resource utilization information, etc.) primarily under the direction of the PD-FE.

In current description of protocols, the TRE-FE performs policy enforcement of Layer 2 under the direction of the TRC-FE, but neither its specific function nor its scope has been determined.

Currently, customer has more flourishing demands for home safety and entertainment services such as video surveillance, network game, P2P transmission and IPTV. To favorably support such services featuring high rate and high service requirements and high safety, operators need to perform QoS control on home network. Home gateway is the core constituent in home network. The home gateway, which connects the home network devices and external network, is the physical interface for interconnectivity between home internal network and all external networks.

Under non-nomadic/non-roaming scenario, the PD-FE in RACF controls CPN Gateway Policy Enforcement Functional Entity (CGPE-FE) via Rh interface to realize the control of home network.

With respect to home network control in Wholesale scenario, the existing technology is not yet able to offer corresponding solution. In the Wholesale scenario as shown in FIG. 2, one party is the network operator wholesaling network layers as infrastructure to multiple service providers; the other party is the service provider providing different types of network services. The network operator who is like the wholesaler of network resource does not provide services, and service provider who is like the service Retail only provides services. To distinguish the functional entities with the same names between network operator and service operator, the name of an entity in Wholesale scenario is prefixed with (W) to identify that the entity belongs to network operator, while an entity prefixed with (R) belongs to service provider. When a customer is under scenario of Wholesale, the customer uses network access of network operator to access the network and enjoy services provided by service provider.

In the Wholesale scenario as shown in FIG. 2, the SCF belongs to an NGN service provider, and the PD-PE in the NGN service provider interacts with the PD-FE in an NGN network operator via Ri interface. The existing technology has not clearly defined the resource and admission control scheme for home network in light of the Wholesale scenario described above. When a service provider does not provide corresponding resource and admission control, it is difficult to guarantee the network service quality for multimedia service used by the customer, thereby the customer experience and system efficiency are impaired.

SUMMARY

One of the main objects of the present disclosure is providing a method for resource and admission control in an NGN home network to realize resource and admission control of the service provider on the home network under a Wholesale scenario. To achieve this object, the technical scheme for the present disclosure is adopted as follows.

A method for resource and admission control in an NGN home network comprises:

resource and admission control functions of service provider performs authorization check on basis of service information from customer, customer subscription information from network attachment control functions of service provider, and local operator policy, and makes resource and admission control policy for customer premises network;

the customer premises network enforces the resource and admission control policy made by resource and admission control functions of the service provider.

Furthermore, an Rh interface is set up between a policy decision function entity (PD-FE) in the resource and admission control functions of service provider and a home gateway policy enforcement function entity in the customer premises network CGPE-FE, and the policy decision function entity sends down the policy rules of the resource and admission control policy to the home gateway policy enforcement function entity in the customer premises network via the Rh interface.

Furthermore, the home gateway policy enforcement function entity enforces the policy rules and sends response message to the policy decision function entity of service provider.

Furthermore, the policy rules sent down by the policy decision function entity of service provider include resource and control processing information.

The resource and control processing information includes reservation holding time, resource request priority level and resource and control session information, etc.

Furthermore, the policy rules sent down by the policy decision function entity include quality of service (QoS) resource information;

The quality of service (QoS) resource information includes media flow description, media priority level, gating and bandwidth, etc.

Furthermore, the policy rules sent down by the policy decision function entity includes resource and control operation information;

The resource and control operation information includes resource reservation mode, etc.

Another object of the present disclosure is providing a system for resource and admission control in an NGN home network. To achieve this object, the technical scheme for the present disclosure is adopted as follows.

A service provider for resource and admission control in an NGN home network, which includes a policy decision function entity, wherein:

the policy decision function entity has function of sending down policy rules to home gateway policy enforcement function entity in a customer premises network; and the policy decision function entity sends down the policy rules to home gateway enforcement function entity of customer premises network via Rh interface.

A customer premises network for resource and management control in an NGN home network, which includes home gateway policy enforcement function entity, wherein:

the home gateway policy enforcement function entity has function of enforcing policy rules sent down by policy decision function entity of service provider; and the home gateway policy enforcement function entity receives the policy rules via Rh interface, which are sent down by the policy decision function entity.

Furthermore, the policy decision function entity of the service provider performs authorization check on basis of customer service information received from service control functions of the service provider, customer subscription information obtained from network attachment control functions of the service provider, and local operator policy, and makes resource and admission control policy for customer premises network (CPN).

Furthermore, the home gateway policy enforcement function entity enforces the policy rules and sends response messages to the policy decision function entity of the service provider.

Furthermore, the policy rules sent down by the policy decision function entity (PD-FE) include resource and control processing information, quality of service (QoS) resource information, and resource and control operation information.

In accordance with the present disclosure, an interface link is established between the policy decision function entity of an NGN service provider and a home gateway enforcement function entity in a customer premises network, wherein the policy decision function entity of the service provider is able to make resource and admission control policies for the customer premises network and send down the policy rules to the customer premises network via the interface, so as to fully guarantee service quality during service use of the customer, thereby improving customer satisfaction.

DETAILED DESCRIPTION

A core idea of the present disclosure is to control the home network via RACF of an NGN service provider, thereby solving the technical problems of resource and admission control in home network under Wholesale scenario.

To give better clarity to the purpose, technical scheme and advantages of the present disclosure, the present disclosure is further detailed with the following embodiments in conjunction with the accompany drawings.

Figure 1:
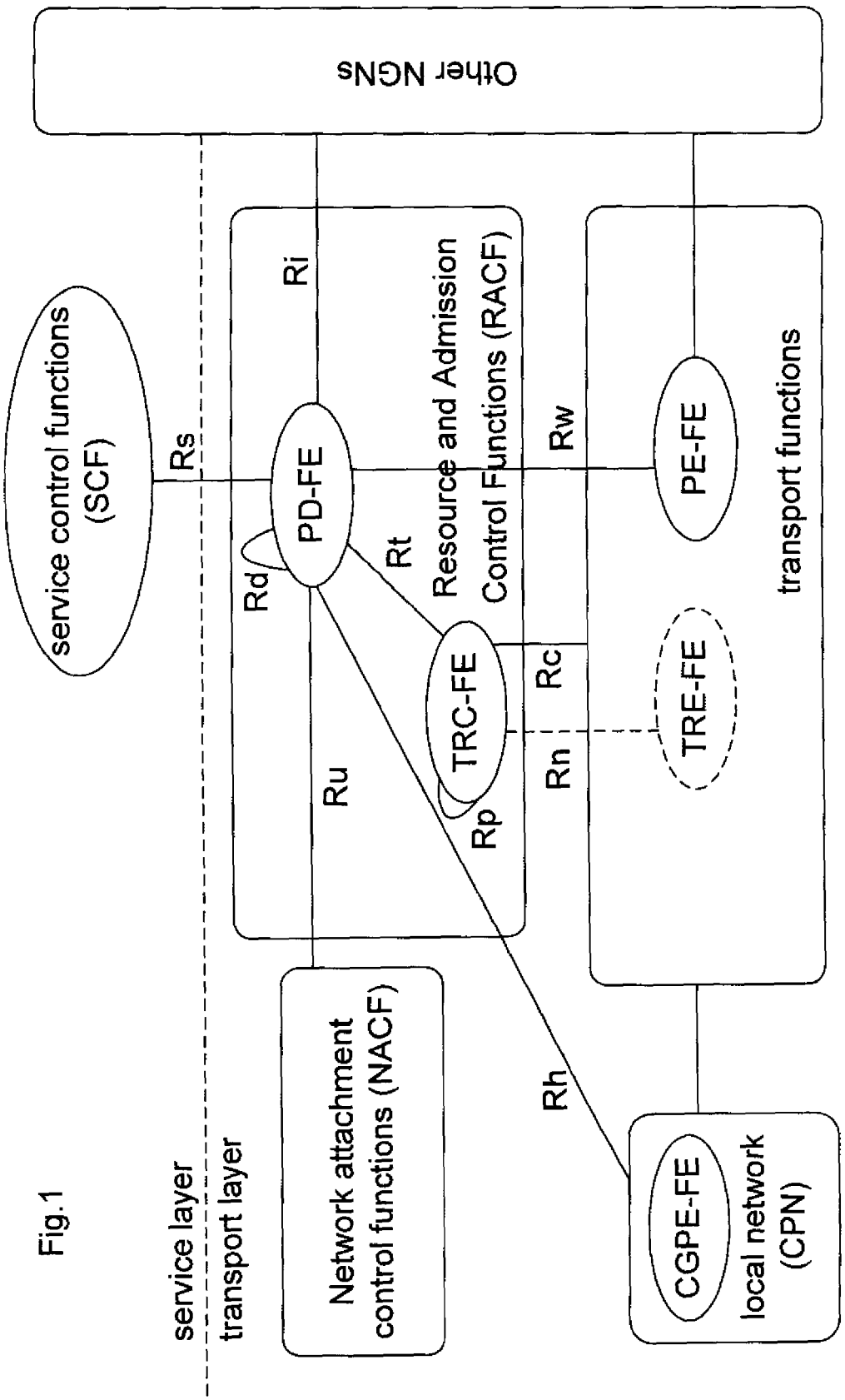
FIG. 1 is the function structure diagram of RACF in ITU-T according to the existing technology.
Figure 2:
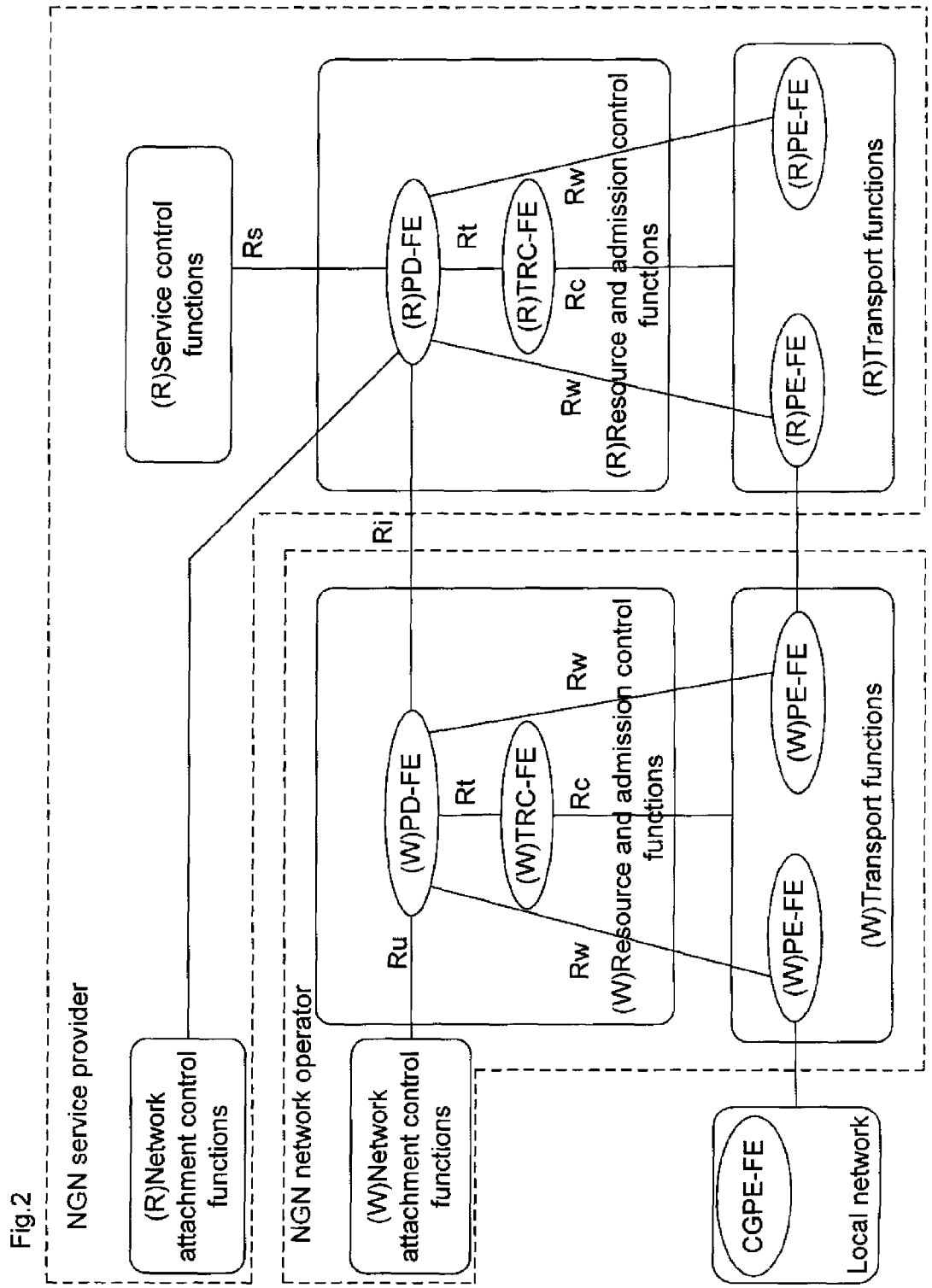
FIG. 2 is the network configuration diagram of RACF under wholesale scenario according to the existing technology.
Figure 3:
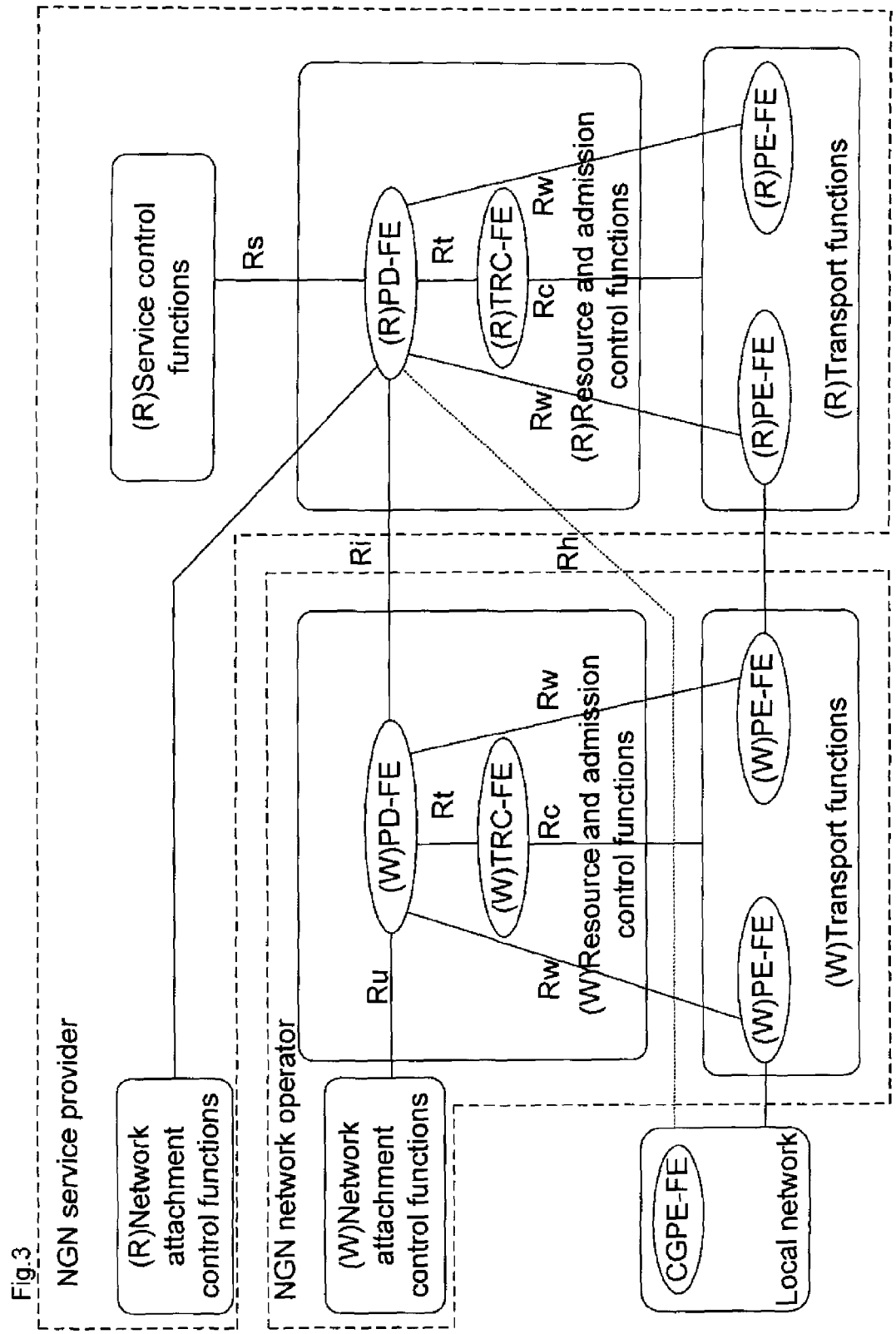
FIG. 3 is a diagram illustrating resource and admission control in home network under wholesale scenario according to the method of the present disclosure.

FIG. 3 is the structure diagram of resource and admission control system in home network under wholesale scenario of the present disclosure, in which the name of a function entity inside an NGN service provider is prefixed with (R) to distinguish from the same function entity in an NGN network operator. Compared with the existing network structure diagram under Wholesale scenario, the difference of the present disclosure is that Rh interface between PD-FE in resource and admission control functions (RACF) of an NGN service provider and CGPE-FE in local network is added into the existing network structure, which is expressed with dashed line in the diagram. The PD-FE in RACF of the NGN service provider sends down the admission control policy to the CGPE-FE in local network via the interface, and the CGPE-FE in local network enforces the admission control policy sent down. The Rh interface adopts the definition of Rh interface in existing RACF draft.

The overall flow of method for resource and admission control in home network under Wholesale scenario is as follows.

Step 1: the RACF of the NGN service provider receives service request message of customer from SCF, and the PD-FE of service provider processes the request; specifically, the PD-FE performs authorization check on basis of service information from SCF, customer subscription information and local operator policy, and then makes the resource and admission control policy;

Step 2: the PD-FE of service provider sends resource initialization request to the CGPE-FE, in which includes policy rules made by the PD-FE of service provider;

Step 3: the CGPE-FE installs the policy rules sent down by the PD-FE of service provider, and replies the resource initialization response message to the PD-FE of service provider.

Embodiment 1

Figure 4:
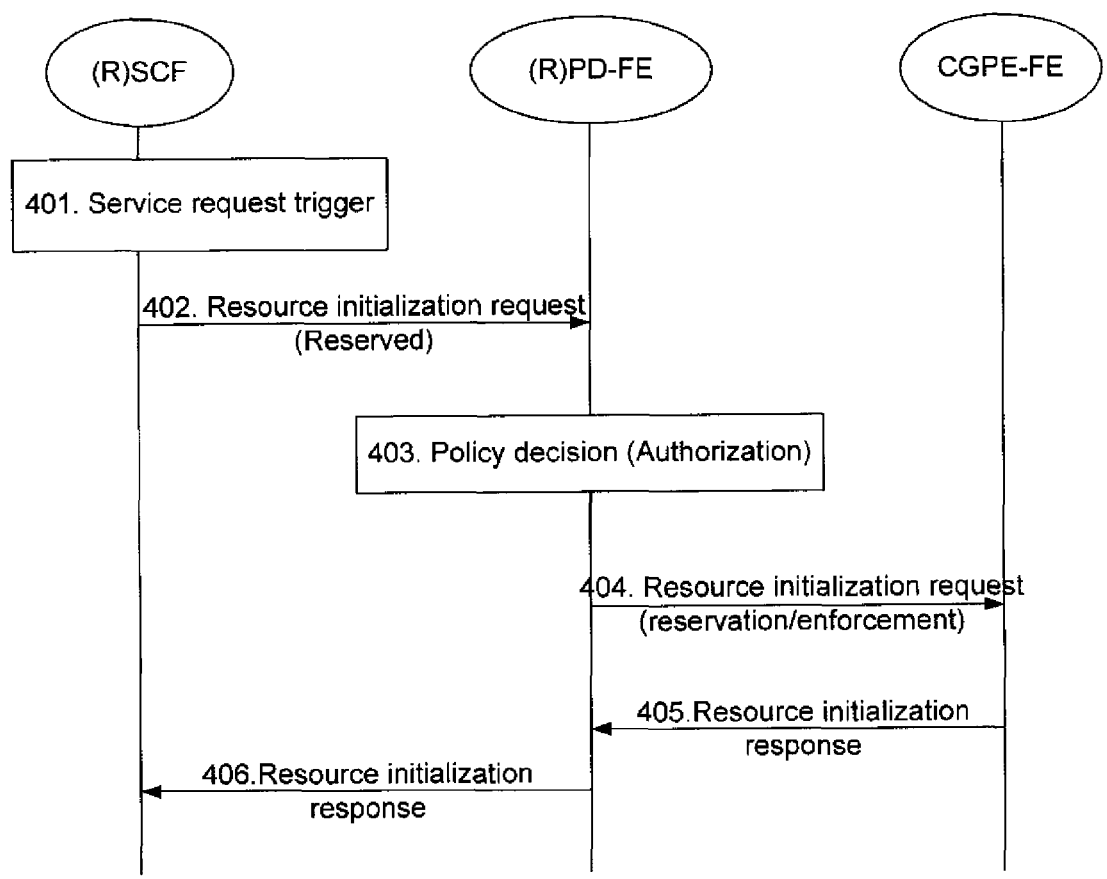
FIG. 4 is a schematic illustrating a resource request procedure for resource and admission control in home network under wholesale scenario according to the method of the present disclosure.

FIG. 4 is a schematic illustrating a resource request procedure for resource and admission control in home network under Wholesale scenario according to the method of the present disclosure, in which the name of a function entity inside an NGN service provider is prefixed with (R) to distinguish from the same function entity in an NGN network operator, with specific steps as follows:

Step 401: customer initiates service requests, sends request message to (R) SCF, and triggers SCF to generate resource initialization request;

Step 402: (R)SCF determines the QoS demand parameters (e.g. bandwidth, service type) of the requested service, and then sends resource initialization request message (reserved) to (R)PD-FE, in which includes media flow description and QoS parameters, etc, to request (R)RACF for QoS resource authorization and reservation to home network;

Step 403: (R)PD-FE performs authorization check on the request, including verification on whether the requested QoS resource is consistent with the local operator policy rules and customer subscription information from (R)NACF; when the authorization check is passed, (R)PD-FE makes policy decisions on the service request according to service information from (R)SCF, customer subscription information from (R)NACF and local operator policy rules;

Step 404: (R)PD-FE sends resource initialization messages to CGPE-FE which may install the policy rules made in step 403 accordingly;

Step 405: CGPE-FE installs policy rules from (R)PD-FE and sends resource initialization response to (R)PD-FE;

Step 406: (R)PD-FE sends resource initialization response to (R)SCF.

Embodiment 2

Figure 5:
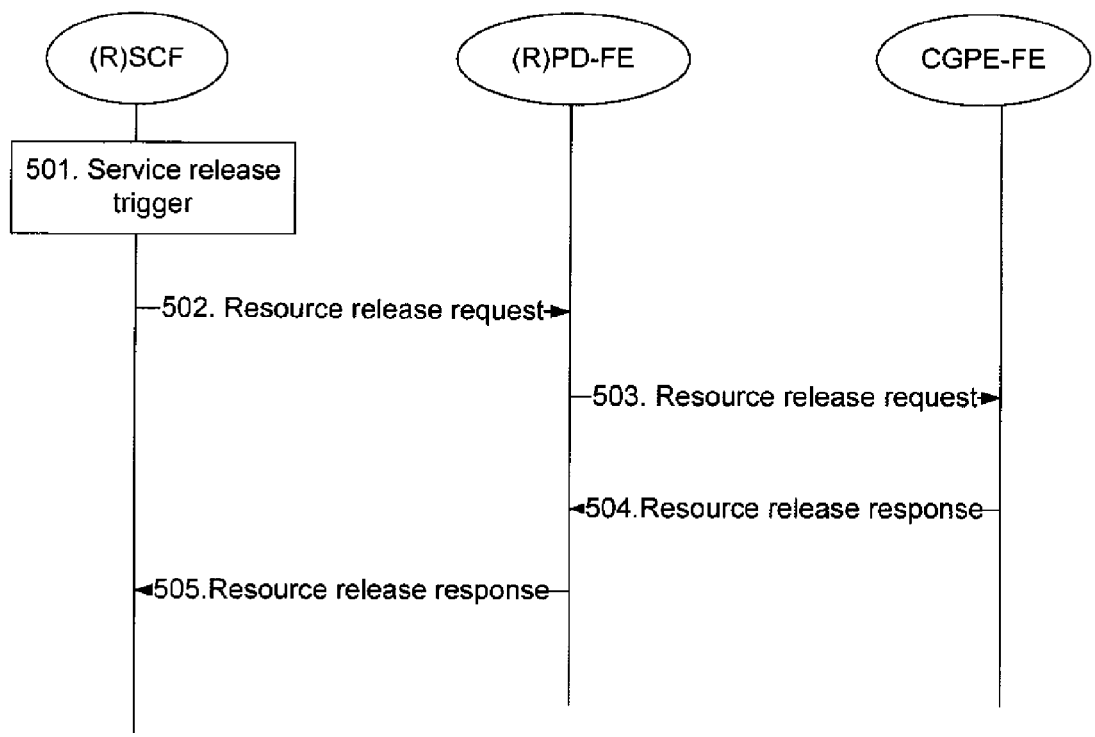
FIG. 5 is a schematic illustrating a resource release procedure for resource and admission control in home network under wholesale scenario according to the method of the present disclosure.

FIG. 5 is a schematic illustrating a resource release procedure for resource and admission control in home network under wholesale scenario according to the method of the present disclosure, in which the name of a function entity inside an NGN service provider is prefixed with (R) to distinguish from the same function entity in an NGN network operator, of which specific steps are as follows:

Step 501: customer initiates service release request, sends release request message to (R)SCF and triggers (R)SCF to generate resource release request;

Step 502: (R)SCF sends resource release request message to (R)PD-FE, in which includes the information of the QoS resource to be released;

Step 503: (R)PD-FE sends resource release request message to CGPE-FE which unloads the installed policy accordingly to release resources;

Step 504: CGPE-FE replies resource release response to (R)PD-FE;

Step 505: (R)PD-FE sends resource release response to (R)SCF.

The above-mentioned are only preferred embodiments of the present disclosure and are not intended to limit the scope of the present disclosure.

INDUSTRIAL APPLICABILITY

In accordance with the present disclosure, an interface link is established between the policy decision function entity of an NGN service provider and a home gateway enforcement function entity in a customer premises network, wherein the policy decision function entity of the service provider is able to make resource and admission control policies for the customer premises network and send down the policy rules to the customer premises network via the interface, so as to fully guarantee service quality during service use of the customer, thereby improving customer satisfaction.

What is claimed is:

1. A method for use with an NGN (next generation network) network operator and an NGN service provider and a customer premises network, the NGN network operator having a respective PD-FE (policy decision functional entity), the NGN network operator providing data transport to the customer premises network, the NGN service provider having a respective PD-FE, the respective PD-FE of the NGN network operator and the respective PD-FE of the NGN service provider being distinct and being communicatively coupled therebetween, the customer premises network having a CGPE-FE (customer premises network gateway policy enforcement functional entity), the method comprising:
within the NGN service provider, making resource and admission control policy for the NGN home network;
communicating the resource and admission control policy from the respective PD-FE of the NGN service provider to the CGPE-FE of the customer premises network;
at the customer premises network, enforcing the communicated resource and admission control policy.

2. The method according to claim 1, wherein the communicating takes place over an Rh interface between the policy decision function entity of the NGN service provider and the gateway policy enforcement function entity in the customer premises network, and the policy decision function entity of the NGN service provider sends down policy rules of the resource and admission control policy to the customer premises network gateway policy enforcement function entity in the customer premises network via the Rh interface.

3. The method according to claim 2, wherein the home gateway policy enforcement function entity enforces the policy rules and sends response messages to the policy decision function entity of the NGN service provider.

4. The method according to claim 2, wherein the policy rules sent down by the policy decision function entity of the NGN service provider include resource and control processing information.

5. The method according to claim 2, wherein the policy rules sent down by the policy decision function entity of the NGN service provider include quality of service (QoS) resource information.

6. The method according to claim 2, wherein the policy rules sent down by the policy decision function entity of the NGN service provider include resource and control operation information.

7. An NGN service provider for resource and admission control in an NGN home network, the NGN service provider disposed to interact with an NGN network operator providing data transport to the NGN home network, the NGN service provider having a respective policy decision function entity, the NGN home network having a CGPE-FE (customer premises network gateway policy enforcement functional entity), wherein:
   the respective policy decision function entity of the NGN service provider has a function of sending down policy rules to the customer premises network gateway policy enforcement function entity in the NGN home network; and
   the policy decision functional entity sends down the policy rules to the customer premises network gateway policy enforcement function entity of the NGN home network via an Rh interface.

8. The NGN service provider according to claim 7, wherein the policy decision function entity of the NGN service provider performs authorization checks on the basis of customer service information received from service control functions of the NGN service provider, on the basis of customer subscription information obtained from network attachment control functions of the NGN service provider, and on the basis of local operator policy, and makes resource and admission control policy for the NGN home network.

9. The NGN service provider according to claim 8, wherein the policy rules sent down by the respective policy decision function entity (PD-FE) of the NGN service provider include resource and control processing information, quality of service (QoS) resource information, and resource and control operation information;
   and wherein the customer premises network gateway policy enforcement function entity enforces the policy rules and sends response messages to the respective policy decision function entity of the NGN service provider.

10. A customer premises network for resource and management control in an NGN home network, the customer premises network disposed to receive data transport from an NGN network operator, the customer premises network disposed to communicate with an NGN service provider, the NGN service provider having a respective policy decision functional entity, the customer premises network including a customer premises network gateway policy enforcement function entity, wherein, the customer premises gateway policy enforcement function entity has a function of enforcing policy rules sent down by the respective policy decision function entity of the NGN service provider; and the home gateway policy enforcement function entity receives the policy rules via an Rh interface, which are sent down by the policy decision function entity of the NGN service provider.

11. The customer premises network according to claim 10, wherein the customer premises network gateway policy enforcement function entity enforces the policy rules and sends response messages to the respective policy decision function entity of the NGN service provider;
   and wherein the policy rules sent down by the respective policy decision function entity (PD-FE) of the NGN service provider include resource and control processing information, quality of service (QoS) resource information, and resource and control operation information.

* * * * *